United States Patent [19]

Nunziata et al.

[11] Patent Number: 5,572,686
[45] Date of Patent: Nov. 5, 1996

[54] BUS ARBITRATION SCHEME WITH PRIORITY SWITCHING AND TIMER

[75] Inventors: Ann B. Nunziata, Cupertino; Riaz A. Moledina, Woodside; Chi-Shing J. Ng, San Jose, all of Calif.

[73] Assignee: Apple Computer, Inc., Cupertino, Calif.

[21] Appl. No.: 461,745

[22] Filed: Jun. 5, 1995

[51] Int. Cl.⁶ .................................................. G06F 13/36
[52] U.S. Cl. ................ 395/296; 395/729; 370/85.6; 364/240; 364/240.1; 364/240.2; 364/242.6; 364/242.92; 364/240.5; 364/DIG. 1
[58] Field of Search .................. 395/293, 729, 395/200.08, 291, 287, 290, 305, 296, 297, 303, 800; 370/85.2, 85.6; 340/825.5, 825.51

[56] References Cited

U.S. PATENT DOCUMENTS

| | | | |
|---|---|---|---|
| 4,682,282 | 7/1987 | Beasley | 395/775 |
| 4,953,081 | 8/1990 | Feal et al. | 395/291 |
| 5,239,631 | 8/1993 | Boury et al. | 395/297 |
| 5,269,010 | 12/1993 | MacDonald | 395/405 |
| 5,274,774 | 12/1993 | Manber et al. | 395/305 |
| 5,278,801 | 1/1994 | Dresser et al. | 365/230.02 |
| 5,303,364 | 4/1994 | Mayer et al. | 395/467 |
| 5,307,320 | 4/1994 | Farrer et al. | 365/230.01 |
| 5,307,466 | 4/1994 | Chang | 395/301 |
| 5,341,494 | 8/1994 | Thayer et al. | 395/442 |
| 5,353,423 | 10/1994 | Hamid et al. | 395/470 |
| 5,371,866 | 12/1994 | Cady | 395/421.01 |
| 5,386,383 | 1/1995 | Raghavachari | 365/189.05 |
| 5,392,436 | 2/1995 | Jansen et al. | 395/293 |
| 5,416,910 | 5/1995 | Moyer et al. | 395/293 |
| 5,430,848 | 7/1995 | Waggener | 395/303 |
| 5,463,624 | 10/1995 | Hogg et al. | 370/85.6 |
| 5,475,850 | 12/1995 | Kahn | 395/290 |
| 5,499,345 | 3/1996 | Watanabe | 395/297 |

OTHER PUBLICATIONS

*AM29200™ RISC Microcontroller User's Manual and Data Sheet*, pp. 9-1 thru 9-10 (Chapter 9, DRAM Controller) 1991.

*Primary Examiner*—Gopal C. Ray
*Attorney, Agent, or Firm*—Burns, Doane, Swecker & Mathis, L.L.P.

[57] ABSTRACT

A system and method for changing an arbitration priority of a bus master are described. A changing system condition can be detected and used to signal the arbiter to change the priority of one or more bus masters. Timers can be provided to delay the request of a changed priority and to return a bus master to its default priority.

18 Claims, 2 Drawing Sheets

BUS ARBITRATION SCHEME WITH PRIORITY SWITCHING AND TIMER

BACKGROUND

The present invention relates generally to digital data processing devices and, more specifically, to bus arbitration in such devices.

As the performance demands on digital data processing devices continue to increase at a meteoric pace, processors have been developed which operate at higher and higher clock speeds. The instruction sets used to control processors have been pared down (e.g., RISC architecture) to make them more efficient. Processor improvements alone, however, have been insufficient to provide the greater performance required by users. The other subsystems which support the processor, e.g., I/O devices and memory devices, must also be designed to operate at higher speeds and support greater bandwidth. In the color printing industry, for example, the demand for greater print resolution and color quality requires tremendous data throughput to satisfy. To accommodate these requirements, functions can be delegated to special processors (e.g., co-processors, ASICs, etc.) which operate in tandem with a central processor to speed up processing. These multi-processor systems typically share system resources for economy and efficiency.

Buses convey data and instructions between elements of digital processing systems including the shared resources mentioned above. Commonly three types or portions of buses are provided, i.e., control, address and data, each of which convey the different types of information connoted by their names. Alternatively, address and data can be multiplexed together on one bus. Local buses provide data transmission capability within a device, whereas system buses connect system components, such as an I/O subsystem, a memory subsystem and a processor, together. In industry parlance, devices which can control the system bus are termed bus masters, while other devices, which are passive and respond to requests from the bus masters, are termed slaves. Some devices may operate either as a slave or a bus master at different times to accomplish different objectives. In many systems, several bus masters compete concurrently for use of the system bus.

In order to avoid bus contention, i.e., the situation where two bus masters have simultaneous control over the system bus, a bus arbiter can be provided to arbitrate between simultaneous requests to use the bus. In such systems, a device which wishes to control the bus will send a bus request signal to the arbiter over a control line. If the arbiter grants the bus request, then an acknowledgement or granting signal is transmitted back to the requesting device over another control line. The methodology by which the arbiter prioritizes requests is called the bus arbitration priority scheme. These priority schemes can be implemented as an ordered list of bus masters (i.e., the highest requesting bus master on the list receives the next bus grant) or as state machines inside the arbiter which provide "round robin" bus access to the bus masters. Both types of bus arbitration priority schemes are described in more detail below. Typically, the priority assigned to each bus master in an arbiter is fixed at the time of system implementation and does not change when the system is in operation.

Each bus master has at least two requirements. One requirement is bus latency, that is, how long a bus master waits to be granted the bus after a bus request is issued. The other requirement is bandwidth, which refers to the amount of data to be moved along a system bus in a unit of time, e.g., a certain number of Mbytes/s. In order for bus operations to be performed smoothly, each bus request should be serviced with a sufficiently short bus latency and with a sufficient bandwidth.

As the number of processors in a system increases (and accordingly the number of potential bus masters), the selection of an appropriate arbitration scheme becomes more important in order to optimize bus latency and bandwidth. Consider a digital processing system in which seven bus masters vie for ownership of the system bus. In ordered arbitration priority schemes, a fixed priority is assigned to the bus masters according to the importance of each bus master's function to the system. When simultaneous bus requests are received, the bus is granted to the requesting bus master that has the highest priority and that bus master is not obligated to release the bus unless a higher priority bus master subsequently requests the bus. Under this scenario it is likely that the lowest priority bus master will experience situations where neither its latency nor its bandwidth requirements are fulfilled because this bus master must wait a potentially infinite amount of time to get the bus, and then it may be allowed to use the bus for only a short period of time if any of the other bus masters want the bus.

In another conventional bus arbitration priority scheme, commonly referred to as a "round robin" priority scheme, a bus master which has just completed a bus operation is not granted the bus for a second operation until all other requesting bus masters have first been granted the bus. Thus a round robin arbitration priority scheme is not likely to fulfill each bus master's latency requirement, particularly in systems having many bus masters.

SUMMARY

According to exemplary embodiments of the present invention, the priority assigned to bus masters by the arbiter can be dynamic. At any point in time, each bus master has a certain priority level. But when either some condition is met, or a certain time has elapsed, or both, the relative priorities of the bus masters can change. Each bus master can be associated with a signal that will indicate to the arbiter that the associated bus master's priority has changed and the arbiter will adjust the priorities of the other bus masters accordingly. In this way, bus latency can be flexibly controlled to accommodate system operations.

One exemplary implementation of the present invention provides two timers in the arbiter for each bus master having a dynamic bus priority. The first timer counts down while a particular master is requesting the bus. If, under the default priority scheme, a bus grant is not received by that master before the timer times out, then the first timer circuit issues an arbitration priority signal to the main arbiter circuit. The priority signal can change the priority of the bits master to any priority desired. For example, the bus master having the lowest priority according to the default priority scheme can be raised to second highest priority, thereby significantly reducing the bus latency of bus requests issued by that bus master.

The second timer monitors the period during which bus requests issued by that bus master are treated by the arbiter using the changed priority. When the second timer times out, the bus master returns to its default priority. Thus, the first and second timers jointly control the bus bandwidth given to a bus master by, for example, preventing bus masters which are raised to a relatively high arbitration priority from monopolizing the bus.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
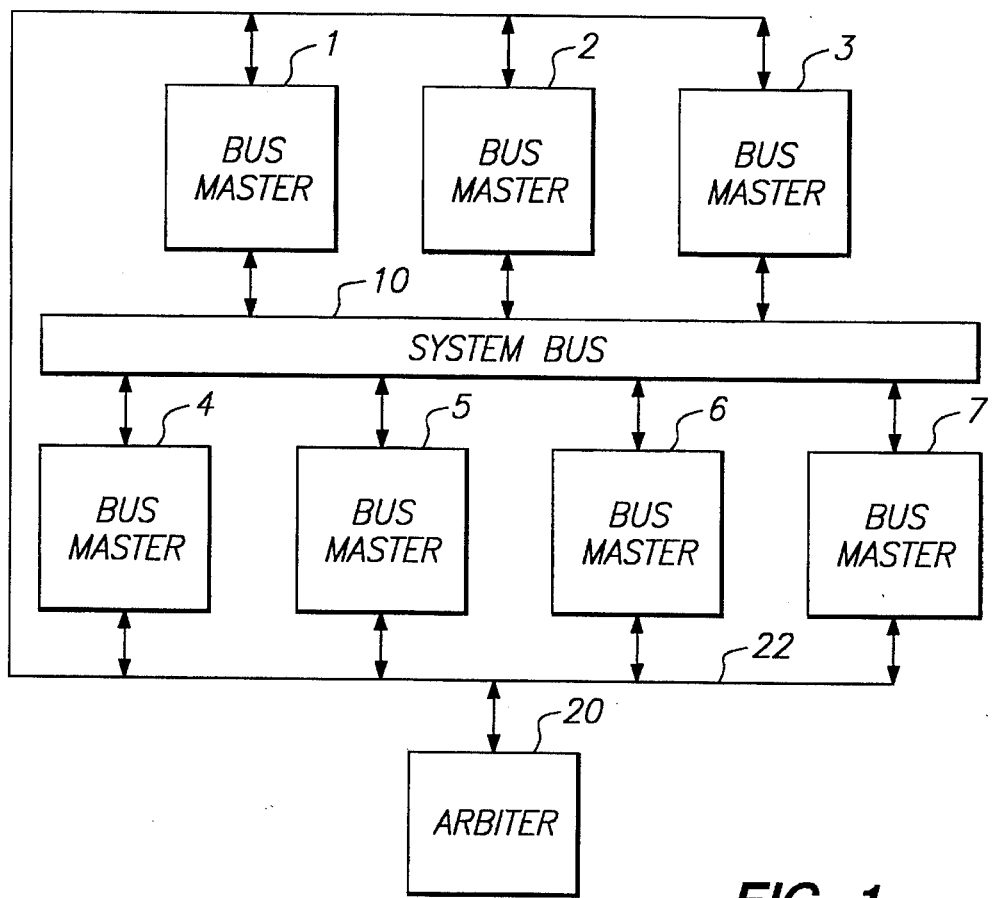
FIG. 1 is a block diagram representation of portions of an exemplary processing system according to the present invention.

An exemplary embodiment of the present invention will now be described beginning with reference to FIG. 1. This general block diagram illustrates seven potential bus masters 1–7 which are bidirectionally coupled to a system bus 10. Of course, the present invention can be also applied to systems having more or fewer than seven bus masters. In this exemplary embodiment, the system bus 10 includes both the address bus and the data bus which are arbitrated jointly for synchronized address and data tenures. The arbiter 20 includes logic for analyzing bus requests and granting the bus according to, for example, an ordered arbitration priority scheme wherein each bus master is assigned a relative priority. The arbiter 20 receives bus requests and issues bus grants over the portion of the control bus referred to in FIG. 1 by reference numeral 22. Although not individually illustrated in FIG. 1, this portion of the control bus 22 can include, for example, two or three dedicated lines associated with each of the bus masters 1–7 to provide request, grant and (optionally) acknowledge capability to the arbiter 20.

Each of the bus masters illustrated in FIG. 1 has been assigned, according to this exemplary embodiment, a relative priority based upon their impact on system performance which, for ease of reference, happens to correspond to their reference numeral. Thus, bus master 1 has a higher priority than bus master 2 which has a higher priority than bus master 3, etc. Simply for the purposes of an example, Table A below describes the priority of each of these bus masters and their functions which may be appropriate for data processing in a color printing application.

TABLE A

| Priority | Bus Master Function |
|---|---|
| 1 | Video Generator |
| 2 | Interface |
| 3 | DRAM DMA channel |
| 4 | Co-processor 1 |
| 5 | Co-processor 2 |
| 6 | Co-processor 3 |
| 7 | General Microprocessor |

In the exemplary embodiment of FIG. 1, bus master 7 is a general purpose microprocessor which handles, among other activities, interactions with a network (not shown). Bus master 7 has been designated as having the lowest priority, since it is anticipated that the microprocessor in this exemplary system performs tasks which are typically not critical in terms of bus latency. However, certain network interrupts serviced by bus master 7, although not requiring a large percentage of the total bandwidth available, still need to be serviced within a relatively short period of time. As the lowest priority bus master, the general microprocessor 7 does not take priority over any of the other bus masters 1–6 and, accordingly, may not be granted the system bus for an extended period of time if the other bus masters are relatively busy. In such a situation, the network interrupts handled by bus master 7 will not be serviced sufficiently quickly and a system error will occur.

In order to overcome this difficulty, a signal can be generated, for example, within the arbiter 20 when the priority for the bus master 7 should be increased. Signals used to request a change in arbitration priority are referred to herein simply as "AP signals" regardless of the direction (increase or decrease) or magnitude of priority change. For example, the priority of bus master 7 could be changed from lowest to second highest priority upon receipt by the arbitration logic (described below with respect to block 34 FIG. 2) of an AP signal. Of course this particular change in priority is merely exemplary and bus master 7 could be switched to any of priorities 1–6 upon receipt of the AP signal. The AP signal can be generated in response to a variety of occurrences, for example, based upon the detection of a particular type of system access (such as a network interrupt) or the condition of certain signals in the system like an interrupt pin in the bus master 7. Another occurrence which can be used to trigger a change in arbitration priority is the amount of time that a bus request has remained unserviced. When bus latency exceeds some threshold, systems according to the present invention can issue an AP signal to increase that bus master's priority and thereby reduce bus latency so that a pending operation is performed more rapidly. An exemplary embodiment illustrating this technique for changing arbitration priority will now be described with respect to FIGS. 2 and 3.

Figure 2:
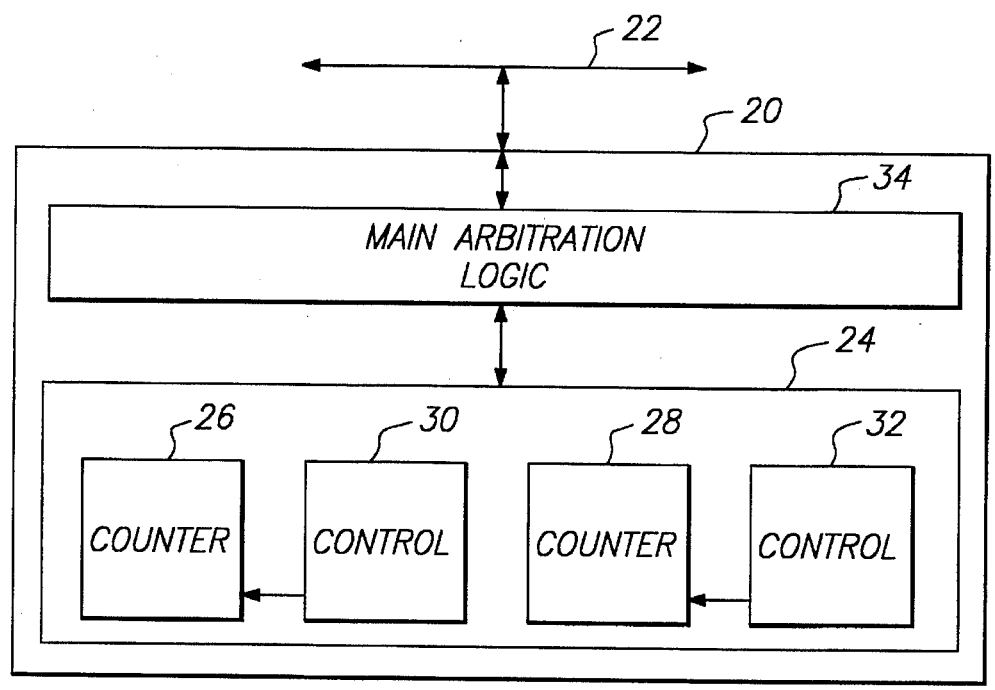
FIG. 2 is a block diagram of an exemplary arbiter portion of FIG. 1 having registers used to adjust an arbitration priority of a bus master.
Figure 3:
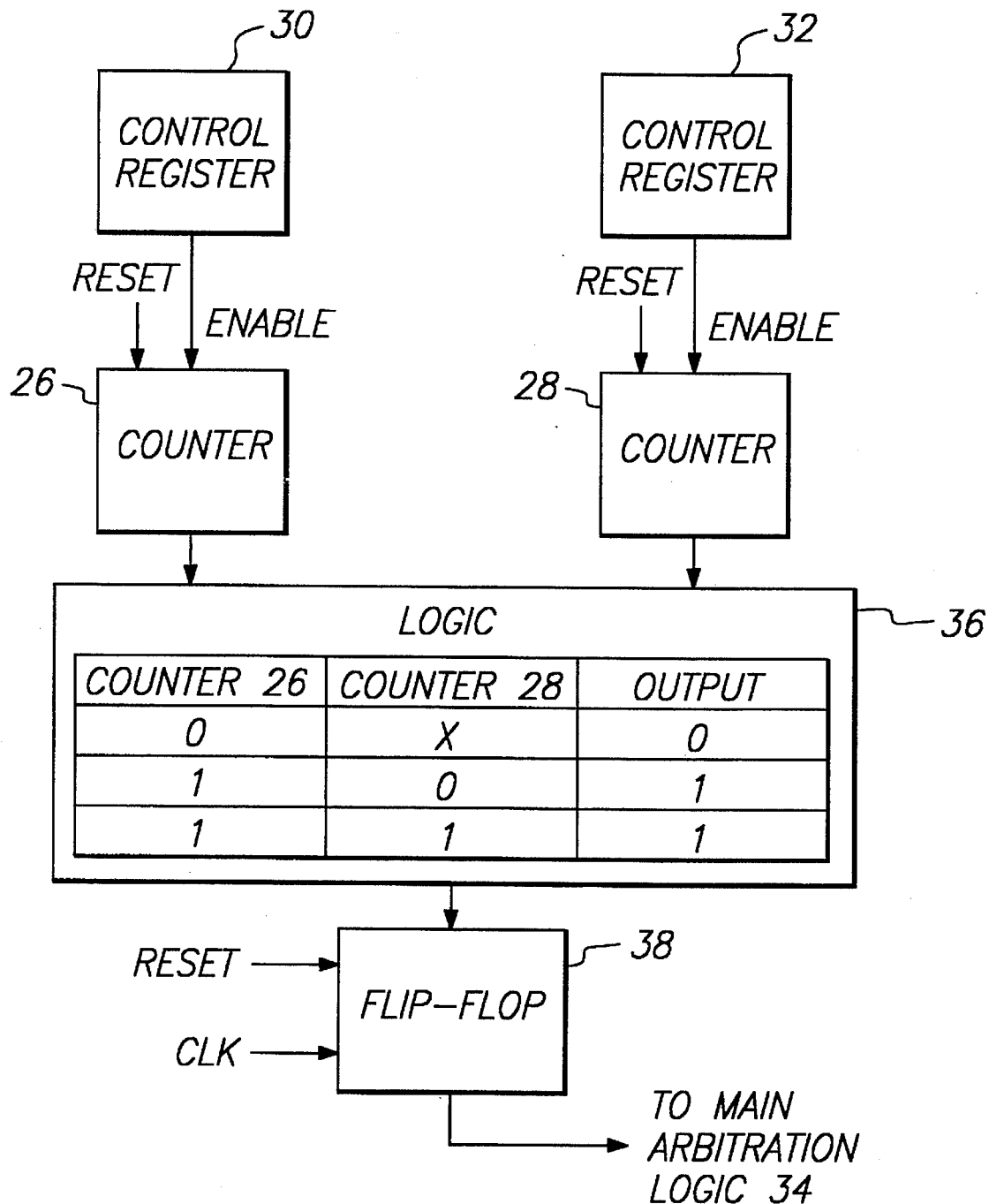
FIG. 3 shows exemplary logic for generating a signal based upon the outputs of the registers of FIG. 2.

In FIG. 2, the arbiter 20 is pictorially illustrated as having associated therewith an AP signal generation circuit 24 including a first counter 26, a second counter 28, a first counter control 30, and a second counter control 32. Although these elements are indicated as being within the confines of arbiter 20, those skilled in the art will appreciate that any or all of these elements may be implemented either in a hardwired manner or as memory addresses which are incremented or decremented under the control of arbiter 20 and need not be physically located within the arbiter.

Elements 26–32 can be used together in order to control assertion of the AP signal to the main arbitration logic 34. Main arbitration logic 34, according to this exemplary embodiment, implements an ordered priority arbitration priority scheme which changes based upon the input AP signal. For example, the counters 26 and 28 can be implemented as count-down timers, each of which can be turned on and off with an associated enable signal from the respective counter control elements 30 and 32. The status of the AP signal will change when the timers 26 and 28 expire. Consider the foregoing example illustrated in Table A wherein bus master 7 is the lowest priority bus master in the default arbitration priority scheme. In its default state, the AP signal can be de-asserted and the priority of the bus master 7 remains that of lowest priority bus master. When bus master 7 issues a bus request, counter control 30 enables timer 26 to begin counting. The timer 26 monitors how long the bus master 7 has been requesting, but has not been granted, the bus 10 while assigned its default arbitration priority. If the bus is granted to bus master 7 before expiration of the timer 26, then timer 26 is reset and bus master 7 returns to its default priority. Otherwise, when the timer 26 expires, the AP signal is asserted, indicating to the arbitration logic 34 that the bus master 7 now has a predetermined, higher priority relative to other bus masters. For example, the bus master can be moved from lowest priority to second highest priority. Any other increase or decrease in priority desirable by a system designer is contemplated by this exemplary embodiment of the present invention which changes the priority of a bus master to provide an increase or decrease in the bus latency associated with bus requests generated by that bus master.

Once an AP signal is generated for bus master 7, counter control element 32 enables timer 28 to begin counting. The timer 28 can be used to determine how long the bus master 7 stays at the higher priority. When the timer 28 expires, the AP signal is de-asserted, and the bus master 7 returns to its default priority so that, for example, the default low priority bus master 7 will not prevent other important functions from being serviced by remaining a high priority bus master for too long.

The counter control elements 30 and 32 also provide the capability to disable the timers 26 and 28, respectively. For example, it may be desirable to not allow a bus master to change priorities during certain activities such as system debugging. This can be accomplished by driving an enable signal line between control element 30 and timer 26 to a disable state, e.g., low. Similarly, the counter control element 32 provides the capability to disable timer 28 and thereby allow the bus master to continue at its changed priority. This feature could be used, for example, to effectively change the original priority scheme implemented in arbitration logic 34 without having to physically cut and rearrange PCB wires to rewire the arbitration logic. The elements 26–32 can, for example, be implemented as registers in the manner described in Table B below.

TABLE B

| Bit(s) | R or W | Description |
|---|---|---|
| | | TIMER 26 |
| 31–16 | R | Each bit held at "0" |
| 15–8 | R/W | Timer 26 Data: The value of these bits provides a count that is to expire before the arbiter will switch the priority of bus master 7 to, for example, second highest. If enabled, the timer starts counting when the bus request is asserted. For example, these bits can be set to hexadecimal FF after the counter is reset. |
| 7–0 | R | Each bit held at "0" |
| | | TIMER 28 |
| 31–16 | R | Each bit held at "0" |
| 15–8 | R/W | Timer 28 Data: The value of these bits provides a count that is to expire before the arbiter will switch the priority of the bus master 7 back to its default priority. If enabled, the timer starts counting when bus master 7 is switched to higher priority. For example, these bits can be set to hexadecimal FF after the counter is reset. |
| 7–0 | R | Each bit held at "0" |
| | | COUNTER CONTROL 30 |
| 31–17 | R | Each bit held at "0" |
| 16 | R/W | Timer 26 Disable: Disable for timer 26. Disabled when 1. Value = 0 or enabled after RESET_asserted. |
| 15–0 | R | Each bit held at "0" |
| | | COUNTER CONTROL 32 |
| 31–17 | R | Each bit held at "0" |
| 16 | R/W | Timer 28 Disable: Disable for timer 28. Disabled when 1. Value = 0 or enabled after RESET_asserted. |
| 15–0 | R | Each bit held at "0" |

TABLE B-continued

| Bit(s) | R or W | Description |
|---|---|---|
| | | RESET_asserted. |
| 15–0 | R | Each bit held at "0" |

These registers can be controlled together to assert and de-assert the AP signal in the manner described above. An exemplary embodiment illustrating control of these registers will now be described with respect to FIG. 3. Therein, the outputs of timers 26 and 28 are input to logic 36. This logic implements the decision structure described above using either hardware or software as is well known in the art to provide an output in accordance with the logic table illustrated therein. For example, after control register 30 has enabled timer 26 to begin counting when bus master 7 has transmitted a bus request to arbiter 20, timer 26 will ultimately expire and then provide as its output a logical 0. At this time, regardless of the output of counter 28, the output of logic circuit 36 is set to logical 0 to indicate that the AP signal should be asserted. Then timer 28 is enabled and, after it has counted its predetermined time period, timer 28 outputs a logical 0 indicating that bus master 7 should be returned to its default priority. As a result, logic circuit 36 outputs a logical 1. At the same time, the logic circuit 36 can also reset timer 26 so that its output value will be a logical 1 since this timer's output should no longer indicate that the priority of bus master 7 is to be changed. After returning bus master 7 to its default priority, logic circuit 36 will then reset timer 28 so that its output is also a logical 1. Thus, as indicated by the third row of the table depicted in block 36, each of the outputs of counter 26, 28 and logic 36 will remain in the logical 1 state so that the priority of bus master 7 remains unchanged from its default priority value until this cycle is again initiated. All of the aforementioned outputs from logic 36 can be input to a flip-flop 38 to provide selectable buffering of the next AP signal which will be transmitted to the main arbitration logic 34 at the next system clock. Of course those skilled in the art will recognize that other logic can be used to implement the desired outputs described above. Moreover, timer 28 and control element 32 could be omitted if a limited duration for the changed priority is not needed.

The timers 26 and 28 have a default value which can be set to the maximum possible value, for example, hexadecimal FF in the exemplary register definitions described in Table B, but may also be loadable by software to optimize bus bandwidth for the system in which they are employed. If more than 256 system clock cycles are to be counted down, then more bits can be used in these registers. Although 32-bit registers are used to illustrate the concepts embodied in the example described above, those skilled in the art will appreciate that the bit length of the register is arbitrary except that the length should be sufficient to hold the desired count.

Moreover, this scheme can be extended so that bus master 7 could have more than two priority levels. In general, in a system having N bus masters, each bus master could have any or all of N possible priorities. For example, if the system had a certain performance pattern wherein three or more priority levels would use bus bandwidth more efficiently, the bus master could be switched between each of the three different priority levels. This could be implemented using, for example, a multi-bit AP signal and additional timers which are activated at different times for different priority levels as will be apparent to one skilled in the art. Additionally, the other bus masters 1–6 could also be implemented to have dynamic priority adjustment in the same manner as that described above with respect to bus master 7.

The control of conditions for switching priority need not be performed by timers as described in the exemplary embodiment set forth above. Any changing condition, such as certain types of system accesses, could be detected and the priority of the bus master could switch based upon these detected changing conditions. For example, AP signal generation circuit 24 could instead be replaced by a signal line from bus master 7 to main arbitration logic 34 whose value is changed when one or more predetermined events within bus master 7 occur. For example, when a network interrupt occurs in bus master 7, which in turn generates a bus request to arbiter 20, the value driven on the signal line could be changed to indicate that an associated change in bus arbitration priority was to be implemented. In this way, bus latency can be reduced for predetermined events which need to be serviced more quickly and returned to default levels for less important bus requests.

Although the exemplary embodiments described herein apply the present invention to an ordered priority arbitration scheme, those skilled in the art will also understand that the present invention can also be applied to other priority schemes. For example, priority switching could be implemented in a round robin priority scheme to override the normal order of bus master servicing when an AP signal is received by the arbitration logic. This could be accomplished to implement the foregoing example by changing the round robin priority scheme such that:

If AP_signal=high then next_bus_master=bus master 7

Else next_bus_master=normal busmaster_order.

The above-described exemplary embodiments are intended to be illustrative in all respects, rather than restrictive, of the present invention. Thus the present invention is capable of many variations in detailed implementation that can be derived from the description contained herein by a person skilled in the art. For example, although the exemplary embodiments have treated the address bus and data bus as a single entity, i.e., the "system" bus, the present invention can also be applied to pipelined systems and split bus technology wherein the address and data buses are separately arbited. In such situations, separate signals can be provided for each of the address and data buses to increase or decrease the priority of a bus master. All such variations and modifications are considered to be within the scope and spirit of the present invention as defined by the following claims.

What we claim is:

1. A data processing system comprising:

a system bus for conveying data;

a plurality of bus masters each connected to said system bus and each able to control said system bus;

an arbiter for controlling access to said system bus by said bus masters such that one of said plurality of bus masters controls said system bus at a time, each of said plurality of bus masters being assigned a priority for determining which bus master shall receive a bus grant when more than one of said bus masters are concurrently requesting the system bus;

at least one of said plurality of bus masters associated with a first timer for monitoring a first period of time during which a bus request of said at least one of said plurality of bus masters is pending;

wherein said first timer generates a signal to said arbiter when said first period of time reaches a first threshold; and wherein said arbiter changes said priority of said at least one of said plurality of bus masters when said signal is received.

2. The system of claim 1, wherein said first timer starts monitoring said first period of time in response to an occurrence of a predetermined event at said at least one of said plurality of bus masters.

3. The system of claim 2, wherein said predetermined event is an interrupt.

4. The system of claim 1, further comprising:

a second timer associated with said at least one of said plurality of bus masters for monitoring a second period of time during which said at least one of said plurality of bus masters is arbitrated at said changed priority and de-asserting said signal line when said second period of time exceeds a second threshold.

5. The system of claim 4, further comprising:

a second control element associated with said second timer for selectively enabling said second timer to begin monitoring said second period of time.

6. The system of claim 1, wherein said system bus includes both an address bus and a data bus.

7. The system of claim 1, further comprising:

a first control element associated with said first timer for selectively enabling said first timer to begin monitoring said first period of time.

8. The system of claim 1, wherein said arbiter includes logic for implementing an ordered priority arbitration protocol.

9. The system of claim 1 wherein said first timer includes a register.

10. A bus arbiter comprising:

a plurality of lines for receiving bus requests;

a plurality of lines for transmitting bus grants;

at least one line for receiving a signal for changing a priority associated with one of said bus requests;

arbitration logic for issuing a bus grant based upon a predetermined priority scheme associated with said bus requests, such that a highest priority pending bus request is granted, wherein said predetermined priority scheme is changed upon receipt of said signal for changing said priority associated with one of said bus requests; and a counter which begins counting upon receipt of said one of said bus requests wherein said counter generates said signal for changing said priority of said one of said bus requests when said counter expires.

11. The bus arbiter of claim 10, wherein said signal for changing said priority associated with one of said bus requests is generated in response to a detected system event.

12. The bus arbiter of claim 10, further comprising:

a control device which selectively enables said counter to begin counting upon receipt of said one of said bus requests.

13. The bus arbiter of claim 10, further comprising:

a second counter which begins counting after said counter generates said signal, wherein another signal is generated by said second counter to return said priority of said one of said bus requests to a default priority when said second counter expires.

14. The bus arbiter of claim 13, further comprising:

a second control device which selectively enables said second counter to begin counting.

15. The bus arbiter of claim 14 wherein said counters and said control devices are implemented as registers.

16. A method of bus arbitration comprising the steps of:

assigning a priority to each of a plurality of bus masters;

receiving, at an arbiter, bus requests from at least two of said plurality of bus masters;

granting said bus to one of said at least two of said plurality of bus masters having a higher priority, unless said arbiter receives a signal changing a default relative priority between said at least two of said plurality of bus masters, and then granting said bus based upon said changed relative priority:

timing a first period starting with generation of one of said bus requests; and transmitting said signal changing said default relative priority between said at least two of said plurality of bus masters when said first period exceeds a first predetermined threshold.

17. The method of claim 16 further comprising the steps of:

timing a second period starting with the transmission of said signal changing said relative priority between said at least two of said plurality of bus masters; and returning said changed, relative priority to said default relative priority when said second period exceeds a second predetermined threshold.

18. The method of claim 16 further comprising the steps of:

detecting a predetermined system event; and transmitting said signal to said arbiter in response to said detection.

* * * * *